(12) United States Patent
Wang (10) Patent No.: US 11,922,671 B2
(45) Date of Patent: Mar. 5, 2024

(54) APPARATUS AND METHOD FOR PROCESSING IMAGE DATA

(71) Applicant: Nokia Technologies OY, Espoo (FI)

(72) Inventor: Tinghuai Wang, Tampere (FI)

(73) Assignee: Nokia Technologies OY, Espoo (FI)

( * ) Notice: Subject to any disclaimer, the term of this patent is extended or adjusted under 35 U.S.C. 154(b) by 626 days.

(21) Appl. No.: 15/734,785

(22) PCT Filed: Aug. 14, 2019

(86) PCT No.: PCT/IB2019/056909
§ 371 (c)(1),
(2) Date: Dec. 3, 2020

(87) PCT Pub. No.: WO2020/044156
PCT Pub. Date: Mar. 5, 2020

(65) Prior Publication Data
US 2021/0232848 A1 Jul. 29, 2021

(30) Foreign Application Priority Data

Aug. 30, 2018 (EP) ..................................... 18191786

(51) Int. Cl.
*G06V 10/44* (2022.01)
*G06N 3/04* (2023.01)
(Continued)

(52) U.S. Cl.
CPC ............. *G06V 10/454* (2022.01); *G06N 3/04* (2013.01); *G06V 10/764* (2022.01); *G06V 10/82* (2022.01)

(58) Field of Classification Search
CPC .... G06V 10/454; G06V 10/764; G06V 10/82; G06V 10/54; G06V 10/774; G06V 30/18057; G06V 10/22; G06V 10/40; G06V 10/44; G06V 10/70; G06V 10/7715; G06V 10/7796; G06V 30/19127; G06N 3/04; G06N 3/044; G06N 3/045; G06N 3/048;
(Continued)

(56) References Cited

U.S. PATENT DOCUMENTS 10,013,640 B1 * 7/2018 Angelova ............ G06V 10/454
10,810,493 B1 * 10/2020 Perozzi .................. G06N 3/044
(Continued)

FOREIGN PATENT DOCUMENTS

CN 108090402 A 5/2018

OTHER PUBLICATIONS

International Search Report PCT/ISA/210 for International Application No. PCT/IB2019/056909 dated Oct. 24, 2019.
(Continued)

*Primary Examiner* — Jose L Couso
(74) *Attorney, Agent, or Firm* — HARNESS, DICKEY & PIERCE, P.L.C.

(57) ABSTRACT

Apparatus for processing image data associated with at least one input image, including a convolutional neural network, CNN,-based encoder configured to provide a plurality of hierarchical feature maps based on the image data, a decoder configured to provide output data based on the plurality of feature maps, wherein the decoder includes a convolutional long short-term memory, Conv-LSTM, module configured to sequentially process at least some of the plurality of hierarchical feature maps.

12 Claims, 6 Drawing Sheets

(51) Int. Cl.
*G06V 10/764* (2022.01)
*G06V 10/82* (2022.01)

(58) Field of Classification Search
CPC .. G06N 3/02; G06N 3/08–088; G06N 3/0445; G06N 3/0454; G06N 3/4046; G06N 7/00; G06N 20/00; G06T 3/4046; G06T 9/002; G06T 2207/20076; G06T 2207/20081; G06T 2207/20084; G06T 7/246; G06T 7/33; G06T 7/73; G06T 2207/22016; G06K 7/1482; G06K 9/46; G06K 9/4604; G06K 9/62; G06K 9/4228; G06K 9/6232; G06K 9/6273; Y10S 128/925; G06F 18/213; G06F 18/2193; G06F 18/231; G06F 18/253

See application file for complete search history.

(56) References Cited

U.S. PATENT DOCUMENTS

| | | | | |
|---|---|---|---|---|
| 10,902,318 | B2* | 1/2021 | Matveev | G06V 10/82 |
| 10,929,681 | B2* | 2/2021 | Min | G06V 10/82 |
| 2015/0324655 | A1* | 11/2015 | Chalasani | G06V 10/764 |
| | | | | 382/103 |
| 2017/0262996 | A1* | 9/2017 | Jain | G06V 10/462 |
| 2017/0357720 | A1* | 12/2017 | Torabi | G06F 16/7844 |
| 2018/0060665 | A1* | 3/2018 | Song | G08B 31/00 |
| 2018/0121731 | A1* | 5/2018 | Min | G06V 10/94 |
| 2018/0189642 | A1* | 7/2018 | Boesch | G06F 30/327 |
| 2018/0276691 | A1* | 9/2018 | Li | G06Q 10/0631 |
| 2018/0322606 | A1* | 11/2018 | Das | G06N 3/063 |
| 2018/0350110 | A1* | 12/2018 | Cho | G06T 9/004 |
| 2018/0373985 | A1* | 12/2018 | Yang | G06V 10/82 |
| 2019/0122373 | A1* | 4/2019 | Natroshvili | G06F 18/2413 |
| 2019/0138887 | A1* | 5/2019 | Salem | G06F 17/16 |
| 2019/0171913 | A1* | 6/2019 | Cheng | G06N 5/01 |
| 2020/0293064 | A1* | 9/2020 | Wu | G06T 7/20 |
| 2020/0302016 | A1* | 9/2020 | Aggarwal | G06V 30/414 |
| 2020/0382612 | A1* | 12/2020 | Zhao | G06N 3/08 |
| 2023/0004749 | A1* | 1/2023 | Jaganathan | G16B 40/20 |
| 2023/0122119 | A1* | 4/2023 | Wu | B60W 30/09 |
| | | | | 701/301 |

OTHER PUBLICATIONS

Office Action for European Application No. 18 191 786.5 dated Sep. 27, 2022.

Office Action for European Application No. 18 191 786.5 dated Feb. 12, 2021.

Kazi Nazmul Haque, "Image Denoising and Restoration with CNN-LSTM Encoder Decoder with Direct Attention Distress Detection in Cancer Patients View Project," Jan. 16, 2018, XP055767375, Retrieved from the Internet: URL:https://www.researchgate.net/profile/Kazi_Nazmul_Haque/publication/322537764_Image_denoising_and_restoration_with_ CNNLSTM_Encoder Decoder_with_Direct_Attention/links/5d90849d299bf1Ocff1888e9/Image-denoising-and-restoration-with-CNNLSTM-Encoder-Decoder-with-Direct-Attention.pdf [retrieved on Jan. 20, 2021].

Jason. Brownlee: "CNN Long Short-Term Memory Networks", Jan. 1, 2017 (Jan. 1, 2017), XP055770718, Retrieved from the Internet: URL:https://machinelearningmastery.com/cnn-long-short-term-memorynetworks/ [retrieved on Feb. 1, 2021].

X. Tao et al. 'Detail-revealing Deep Video Super-resolution' *The Chinese University of Hong Kong*, Apr. 10, 2017, pp. 1-9.

X. Mao et al. 'Image Restoration Using Very Deep Convolutional Encoder-Decoder Networks with Symmetric Skip Connections' *29th Conference on NIPS*, Spain, Sep. 1, 2016, pp. 1-9.

J. Donahue et al. 'Long-term Recurrent Convolutional Networks for Visual Recognition and Description', May 31, 2016, pp. 1-14.

K. Kim 'Deep Learning' *Healthcare Informatics Research*, vol. 22, No. 4, 2016, pp. 351-354.

K. He et al. 'Deep Residual Learning for Image Recognition' *Microsoft Research*, Dec. 10, 2015, pp. 1-12.

C. Szegedy et al. 'Going deeper with convolutions', Sep. 17, 2014, pp. 1-12.

A. Krizhevsky et al. 'ImageNet Classification with Deep Convolutional Neural Networks' *Advances in Neural Information Processing Systems 25 NIPS*, 2012, pp. 1-9.

* cited by examiner

APPARATUS AND METHOD FOR PROCESSING IMAGE DATA

CROSS-REFERENCE TO RELATED APPLICATIONS

This application is a national phase under 35 U.S.C. § 371 of PCT International Application No. PCT/IB2019/056909, which has an International filing date of Aug. 14, 2019, which claims priority to European Application No. 18191786.5, filed Aug. 30, 2018, the entire contents of each of which are hereby incorporated by reference.

FIELD OF THE INVENTION

The disclosure relates to an apparatus for processing image data associated with at least one input image, comprising a convolutional neural network, CNN,-based encoder configured to provide a plurality of hierarchical feature maps based on said image data, and a decoder configured to provide output data based on said plurality of feature maps.

The disclosure further relates to a method of operating such apparatus.

BACKGROUND

The concept of convolutional neural networks is known. Regarding details related to CNNs and encoder/decoder structures, reference is made to Goodfellow et al., 2016, "Deep Learning", MIT Press, http://www.deeplearningbook.org, 2016, [reference 1]. Regarding details of CNNs cf. e.g. Chapter 9 of reference 1.

SUMMARY

Some embodiments feature an apparatus for processing image data associated with at least one, preferably single, input image, comprising a convolutional neural network, CNN,-based encoder configured to provide a plurality of hierarchical feature maps based on said image data, a decoder configured to provide output data based on said plurality of feature maps, wherein said decoder comprises a convolutional long short-term memory, Conv-LSTM, module configured to sequentially process at least some of said plurality of hierarchical feature maps.

According to preferred embodiments, the CNN-based encoder (hereinafter: "encoder", for simplicity) is configured to produce progressively coarser (i.e., comprising lower resolution, as compared to the resolution of the input image) feature maps to encode contextual and/or appearance information of a given input image, whereby different levels of hierarchy are defined. For this purpose, the encoder applies various steps of convolution and/or downsampling (e.g., max-pooling or average pooling). As an example, some feature maps at a first level of hierarchy may represent comparatively simple features such as edges, while some feature maps at a different level of hierarchy may represent comparatively complex features such as more complex shapes such as faces or the like.

According to further preferred embodiments, the CNN-based encoder may e.g. comprise a convolutional neural network, CNN, e.g. a CNN which is pretrained for image classification tasks.

According to further preferred embodiments, the decoder is configured to progressively map the (low resolution) encoder feature maps to higher resolution feature maps, preferably to full input resolution feature maps, which e.g. enables pixel-wise classification. According to further embodiments, the decoder may be a RNN (recurrent neural network)-based decoder.

According to further preferred embodiments, so-called skip connections from encoder layers to decoder layers are provided to incorporate low-level but high-resolution feature maps in order to obtain accurate per-pixel predictions. In other words, a skip-connection enables to transfer information (data) from a feature map at a particular level of hierarchy from the encoder directly to the decoder, which may be considered as bypassing further encoder (and decoder) processing through further levels of hierarchy.

In theory, using all feature maps (hierarchical feature representation) from the encoder may produce accurate predictions since information at various contextual levels is retained. In practice, however, it is intractable since it requires prohibitive amount of (computer) memory even for one input image. Furthermore, stacked feature maps may lead to very high dimension data which might make prediction difficult. As a consequence, according to further preferred embodiments, the decoder concatenates feature maps from the encoder at various contextual or hierarchical levels, respectively, layer by layer and may use convolution layers (or deconvolutional layers) to reduce the number of feature channels in the meanwhile.

However, conventional CNN-based image processing techniques tend to gradually 'forget' the higher level information extracted from the output of encoder path through the way traversing the decoder path. In view of this, the principle according to the embodiments enables the decoder to "remember" (i.e., retain) important information for a long period of 'time' (the sequence of feature maps from encoder), particularly by using said Conv-LSTM module, without requiring to keep all feature maps in (computer) memory or losing important features over transformations toward prediction. In other words, the principle according to the embodiments avoids significant disadvantages of prior art based on forgetting/disregarding higher level information extracted from the output of the encoder path and on requiring huge amounts of memory for keeping an increased number of feature maps available for processing by the decoder. Thus, advantageously, the principle according to the embodiments enables to memorize key features across multiple semantic levels (i.e., levels of hierarchy) and to make predictions based on the whole cross-semantics feature pyramid, i.e. rather than using only a final feature map as proposed by conventional approaches.

In other words, an important aspect of at least some embodiments is that the Conv-LSTM module is configured to model at least some of said plurality of hierarchical feature maps as sequential data on a decoder path, which improves the decoder in effectively incorporating the multi-scale contextual information (i.e., the hierarchical feature maps) from the encoder network.

According to further preferred embodiments, said Conv-LSTM module comprises a single Conv-LSTM unit which is configured to receive as input signals feature map information characterizing at least one feature map of a predetermined hierarchical level of said decoder and/or hidden state information characterizing a hidden state or a transformed hidden state of a preceding hierarchical level of said decoder. Using a single Conv-LSTM unit, which is enabled by the sequential processing, reduces costs and complexity and at the same time enables to efficiently retain and/or propagate information of one or more feature maps from a first level of hierarchy to further levels of hierarchy in the decoder in a controllable way, especially without requiring to store all feature maps provided by the encoder.

According to further preferred embodiments, said single Conv-LSTM unit is configured to update a cell status and/or a hidden state of said predetermined hierarchical level of said decoder depending on said input signals.

According to further preferred embodiments, a processing unit is provided that is configured to perform up-sampling and/or a deconvolution and/or convolution of said cell status and/or a hidden state of said predetermined hierarchical level of said decoder, which enables to accommodate a change of spatial resolution across the feature map pyramid.

According to further preferred embodiments, said single Conv-LSTM unit operates in accordance with at least one of the following equations: a) $f_i=\sigma(W_f \cdot [h_{i-1}^{\times 2}, x_i]+b_f)$, b) $s_i=\sigma(W_s \cdot [h_{i-1}^{\times 2}, x_i]+b_s)$, c) $\tilde{C}_i=\tanh(W_c \cdot [h_{i-1}^{\times 2}, x_i]+b_c)$, d) $C_i=f_i*C_{i-1}+s_i*\tilde{C}_i$, e) $o_i=\sigma(W_o \cdot [h_{i-1}^{\times 2}, x_i]+b_o)$, f) $h_i=o_i*\tanh(C_i)$, g) $h_i^{\times 2}=\text{Conv}_{1\times 1}(B_2(h_i))$, wherein $f_i$ represents a forget gate, $\sigma(\cdot)$ represents the sigmoid function, $W_f$ represents parameters associated with the forget gate, $x_i$ represents input feature map information, $h_{i-1}^{\times 2}$ represents a transformed hidden state of a preceding hierarchical level of said decoder, $b_f$ represents bias parameters associated with the forget gate, $s_i$ represents an input gate, $W_s$ represents parameters associated with the input gate, $bs$ represents parameters associated with the input gate, $\tilde{C}_i$ represents a candidate new cell state, $\tanh(\cdot)$ is the hyperbolic tangent function, $W_c$ represents parameters associated with the candidate new cell state, $b_c$ represents bias parameters associated with the candidate new cell state, $C_{i-1}$ represents an old cell state, oi represents an output gate, $W_o$ represents parameters associated with the output gate, $b_o$ represents bias parameters associated with the output gate, $h_i$ represents a hidden state, $B_2(h_i)$ represents a bilinearly upsampled hidden state, and $h_i^{\times 2}$ represents said bilinearly upsampled hidden state transformed by a 1×1 convolutional layer.

As an example, equation a) and the forget gate indicate how much of a previous feature map should be forgotten during processing by the Conv-LSTM unit. As a further example, the input gate, equation b), decides how much of the new information should be taken into account to update the cell state. According to further embodiments, the candidate new cell state $\tilde{C}_i$ is computed in equation c). According to further embodiments, by forgetting partial old cell state and adding the weighted candidate new cell state, the current cell state value is updated in equation d).

According to further embodiments, equation e) accounts for the output gate which modulates the output hidden state computed by putting the cell state through the tanh function, cf. equation f).

According to further preferred embodiments, the CNN-based encoder and/or the decoder comprise at least portions of a CNN of at least one of the following types: ResNet, VGG-Net, AlexNet, Inception. Regarding details of VGG and ResNet cf. e.g. Kaiming He, Xiangyu Zhang, Shaoqing Ren, Jian Sun, "Deep Residual Learning for Image Recognition", arXiv:1512.03385, https://arxiv.org/abs/1512.03385.

Regarding details of AlexNet cf. e.g. http://papers.nips.cc/paper/4824-imagenet-classification-with-deep-convolutional-neural-networks.pdf.

Regarding details of the Inception network, cf. e.g. https://arxiv.org/pdf/1409.4842v1.pdf.

Further embodiments feature an apparatus for processing image data associated with at least one input image, comprising at least one processor and at least one memory, the at least one memory storing computer program code, the at least one memory and the computer program code being configured to, with the at least one processor, cause the apparatus to at least in part perform: —provide a plurality of hierarchical feature maps based on said image data, by encoding the image data with a CNN-based encoder, —provide output data based on said plurality of feature maps, by sequentially processing at least some of said plurality of hierarchical feature maps with a Conv-LSTM module.

Further embodiments feature a method of operating an apparatus for processing image data associated with at least one input image, said apparatus comprising a convolutional neural network, CNN,-based encoder configured to provide a plurality of hierarchical feature maps based on said image data and a decoder configured to provide output data based on said plurality of feature maps, wherein said decoder comprises a convolutional long short-term memory, Conv-LSTM, module, and wherein said Conv-LSTM module sequentially processes at least some of said plurality of hierarchical feature maps.

Further preferred embodiments are provided by the dependent claims.

Further embodiments feature a method according to the embodiments, e.g. as defined by or based on independent method claim 7, wherein said method is used for at least one of the following: a) dense prediction, particularly semantic segmentation and/or optical flow estimation, b) sparse prediction, particularly image classification and/or image recognition and/or object detection and/or regression, particularly object and/or camera pose estimation. In other words, the generation of output data by the decoder may involve steps of image analysis and/or classification as mentioned above, or such steps of image analysis and/or classification may be performed based on the output data as provided by the decoder according to the embodiments.

According to further preferred embodiments, the method according to the embodiments may e.g. be used by or applied on devices, preferably mobile devices, such as mobile phones, camera connected smart home devices, video and teleconference devices, smart watches and other visual sensor-connected IoT devices.

BRIEF DESCRIPTION OF THE FIGURES

Further features, aspects and advantages of the illustrative embodiments are given in the following detailed description with reference to the drawings in which.

DESCRIPTION OF THE EMBODIMENTS

Figure 1:
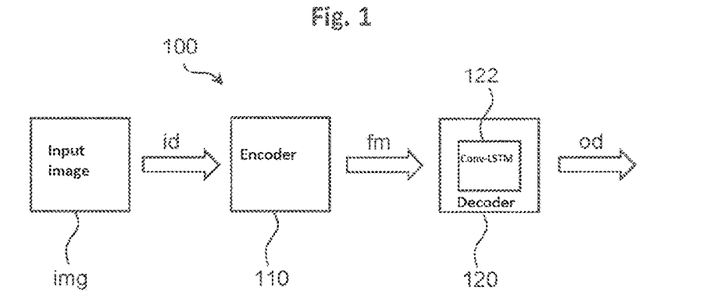
FIG. 1 schematically depicts a block diagram of an apparatus according to an embodiment, FIG. 2 schematically depicts a block diagram of an LSTM module according to a further embodiment, FIG. 3 schematically depicts a block diagram of aspects of an apparatus according to a further embodiment, FIG. 4 schematically depicts a block diagram of an apparatus according to further embodiments, FIG. 5 schematically depicts a simplified flow-chart of a method according to an embodiment, and FIG. 6A, 6B, 6C each schematically depict details of aspects of an apparatus according to further embodiments.

FIG. 1 schematically depicts a block diagram of an apparatus 100 according to an embodiment. The apparatus 100 may be used for processing image data id associated with at least one, preferably single, input image. As an example, the input image img may be a digital image, and the image data id can be represented by at least one matrix of intensity values, e.g. for a greyscale image. Color images may e.g. be represented by three matrices, one matrix for each color channel (e.g. red, green, blue for the RGB system), and the like.

The apparatus 100 comprises a convolutional neural network, CNN,-based encoder 110 configured to provide a plurality of hierarchical feature maps fm based on said image data, a decoder 120 configured to provide output data od based on said plurality of feature maps fm, wherein said decoder 120 comprises a convolutional long short-term memory, Conv-LSTM, module 122 configured to sequentially process at least some of said plurality of hierarchical feature maps fm.

According to preferred embodiments, the encoder 110 is configured to produce progressively coarser (i.e., comprising lower resolution, as compared to the resolution of the input image img) feature maps fm to encode contextual and/or appearance information of the input image img, whereby different levels of hierarchy are defined. For this purpose, the encoder may apply various steps of convolution and/or downsampling (e.g., max-pooling or average pooling). As an example, some feature maps at a first level of hierarchy may represent comparatively simple features of the input image img such as edges, while some feature maps at a different level of hierarchy may represent comparatively complex features such as more complex shapes such as faces or the like.

According to further preferred embodiments, the encoder 110 may e.g. comprise a convolutional neural network, CNN, e.g. a CNN which is pretrained for image classification tasks.

According to further embodiments, the feature maps fm provided by CNN-based encoders 110 are ordered with increasing level of semantics, i.e., lower layers in the encoder 110 usually capture the low-level features of an image img such as basic shapes (e.g., edges) while higher layers are likely to extract high level features such as the face of a person or other complex shapes.

According to further preferred embodiments, the decoder 120 is configured to progressively map the (low resolution) feature maps fm obtained from the encoder to higher resolution feature maps, preferably to full input resolution feature maps, which may e.g. represent said output data od and which e.g. enables pixel-wise classification.

According to further preferred embodiments, so-called skip connections (not shown in FIG. 1) from encoder layers to decoder layers are provided to incorporate low-level but high-resolution feature maps in order to obtain accurate per-pixel predictions. In other words, a skip-connection enables to transfer information (data) from a feature map at a particular level of hierarchy from the encoder 110 directly to the decoder 120, which may be considered as bypassing further encoder (and decoder) processing through further levels of hierarchy.

In theory, using all feature maps fm (hierarchical feature representation) from the encoder 110 may produce accurate predictions since information at various contextual levels is retained. In practice, however, it is intractable since it requires prohibitive amount of (computer) memory even for one input image img. Furthermore, stacked feature maps may lead to very high dimension data which might make prediction difficult. As a consequence, according to further preferred embodiments, the decoder 120 concatenates feature maps fm from the encoder 110 at various contextual or hierarchical levels, respectively, layer by layer and may use convolution layers (or, more specifically, deconvolutional layers) to reduce the number of feature channels in the meanwhile. Data processing within the decoder 120 may e.g. comprise upsampling and/or unpooling and/or deconvolution and the like.

As conventional CNN-based image processing techniques tend to gradually 'forget' the higher level information extracted from the output of an encoder path of the encoder 110 through the way traversing a decoder path of the decoder 120, the principle according to the embodiments is proposed which enables the decoder 120 to "remember" (i.e., retain) important information for a long period of 'time' (the sequence of feature maps from encoder), particularly by using said Conv-LSTM module 122. In other words, the principle according to the embodiments avoids significant disadvantages of prior art based on forgetting/disregarding higher level information extracted from the output of the encoder path and on requiring huge amounts of memory for keeping an increased number of feature maps available for processing by the decoder. Thus, advantageously, the principle according to the embodiments enables to memorize key features across multiple semantic levels (i.e., levels of hierarchy) and to make predictions based on the whole cross-semantics feature pyramid, i.e. rather than using only a final feature map as proposed by conventional approaches.

In other words, an important aspect of at least some embodiments is that the Conv-LSTM module 122 is configured to model at least some of said plurality of hierarchical feature maps fm as obtained by the encoder 110 as sequential data on a decoder path of the decoder 120, which improves the decoder 120 in effectively incorporating the multi-scale contextual information (i.e., the hierarchical feature maps) from the encoder 110.

Figure 2:
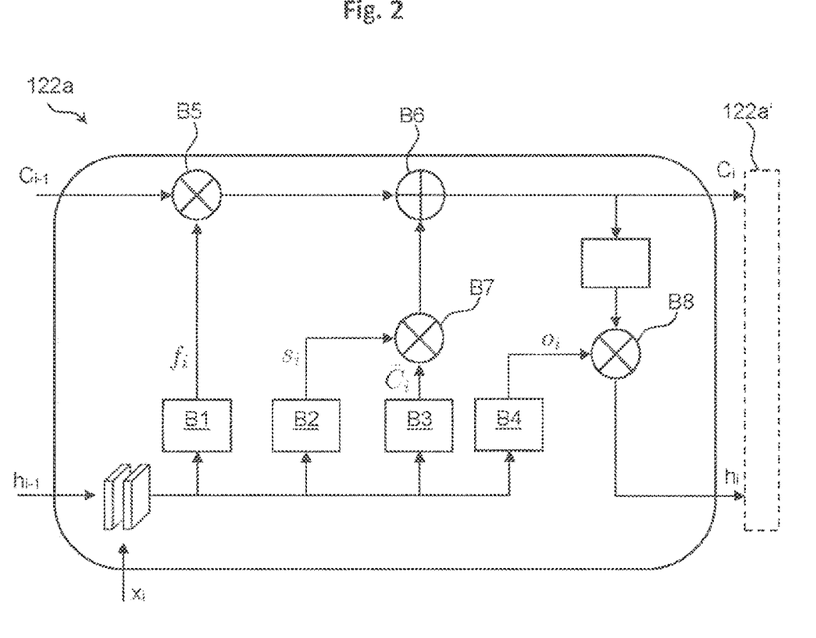

According to further preferred embodiments, said Conv-LSTM module 122 comprises a single Conv-LSTM unit 122a, cf. the simplified block diagram of FIG. 2, which is configured to receive as input signals feature map information $X_i$ characterizing at least one feature map fm (FIG. 1) of a predetermined hierarchical level of said decoder 120 and/or hidden state information $h_{i-1}$ characterizing a hidden state or a transformed hidden state of a preceding hierarchical level of said decoder 120 (FIG. 1). Using a single Conv-LSTM unit 122a (FIG. 2), which is enabled by the sequential processing, reduces costs and complexity and at the same time enables to efficiently retain and/or propagate information of one or more feature maps fm (FIG. 1) from a first level of hierarchy to further levels of hierarchy in the decoder 120 in a precisely controllable way, especially without requiring to store all feature maps provided by the encoder 110.

According to further preferred embodiments, said single Conv-LSTM unit 122a is configured to update a cell status $C_i$ and/or a hidden state $h_i$ of said predetermined hierarchical level of said decoder 120 depending on said input signals $X_i$, $h_{i-1}$.

According to further preferred embodiments, a processing unit 122a' is provided that is configured to perform up-sampling and/or a deconvolution (e.g., 1×1 deconvolution) of said cell status $C_i$ and/or a hidden state $h_i$ of said predetermined hierarchical level of said decoder 120, which enables to accommodate a change of spatial resolution across the feature map pyramid, e.g. towards a full-resolution output image, cf. the output data od of FIG. 1.

According to further preferred embodiments, said single Conv-LSTM unit 122a operates in accordance with at least one of the following equations: a) $f_i = \sigma(W_f \cdot [h_{i-1}^{\times 2}, x_i] + b_f)$, b) $s_i = \sigma(W_s \cdot [h_{i-1}^{\times 2}, x_i] + b_s)$, c) $\tilde{C}_i = \tanh(W_c \cdot [h_{i-1}^{\times 2}, x_i] + b_c)$, d) $C_i = f_i * C_{i-1} + s_i * \tilde{C}_i$, e) $o_i = \sigma(W_o \cdot [h_{i-1}^{\times 2}, x_i] + b_o)$, f) $h_i = o_i * \tanh(C_i)$, g) $h_i^{\times 2} = \text{Conv}_{1 \times 1}(B_2(h_i))$, wherein $f_i$ represents a forget gate, σ(·) represents the sigmoid function, $W_f$ represents parameters associated with the forget gate, $x_i$ represents input feature map information, $h_{i-1}^{\times 2}$ represents a transformed hidden state of a preceding hierarchical level of said decoder, $b_f$ represents bias parameters associated with the forget gate, $s_i$ represents an input gate, $W_s$ represents parameters associated with the input gate, bs represents bias parameters associated with the input gate, $\tilde{C}_i$ represents a candidate new cell state, tanh(·) is the hyperbolic tangent function, $W_c$ represents parameters associated with the candidate new cell state, $b_c$ represents bias parameters associated with the candidate new cell state, $C_{i-1}$ represents an old cell state, $o_i$ represents an output gate, $W_o$ represents parameters associated with the output gate, $b_o$ represents bias parameters associated with the output gate, $h_i$ represents a hidden state, $B_2(h_i)$ represents a bilinearly upsampled hidden state, and $h_i^{\times 2}$ represents said bilinearly upsampled hidden state transformed by a 1×1 convolutional layer.

As an example, equation a) and the forget gate indicate how much of a previous feature map should be forgotten during processing by the (single) Conv-LSTM unit 122a. As a further example, the input gate, equation b), decides how much of the new information should be taken into account to update the cell state $\tilde{C}_i$. According to further embodiments, the candidate new cell state is computed in equation c).

According to further embodiments, by forgetting partial old cell state and adding the weighted candidate new cell state, the current cell state value is updated in equation d). According to further embodiments, equation e) accounts for the output gate which modulates the output hidden state computed by putting the cell state through the tanh function, cf. equation f).

As an example, block B1 of FIG. 2 is configured to evaluate equation a), i.e. the forget gate, block B2 is configured to evaluate equation b), block B3 is configured to evaluate equation c), block B4 is configured to evaluate equation e), block B5 applies the forget gate to previous cell state $C_{i-1}$, block B7 applies the input gate to the candidate new cell state $\tilde{C}_i$, block B6 combines the outputs of blocks B5, B7 thus obtaining the new cell state $C_i$ of the Conv-LSTM unit 122a, cf. equation d), and block B8 implements equation f). Index variable "i" indicates a current level or layer being processed.

According to further embodiments, the involved parameters $W_f$, $W_s$, $W_c$, $W_o$ and bias parameters $b_f$, $b_s$, $b_c$, $b_o$ may be learned or trained, respectively, in a training phase.

According to further preferred embodiments, the CNN-based encoder 110 (FIG. 1) and/or the decoder 120 comprise at least portions of a CNN of at least one of the following types: ResNet, VGG-Net, AlexNet, Inception.

Figure 3:
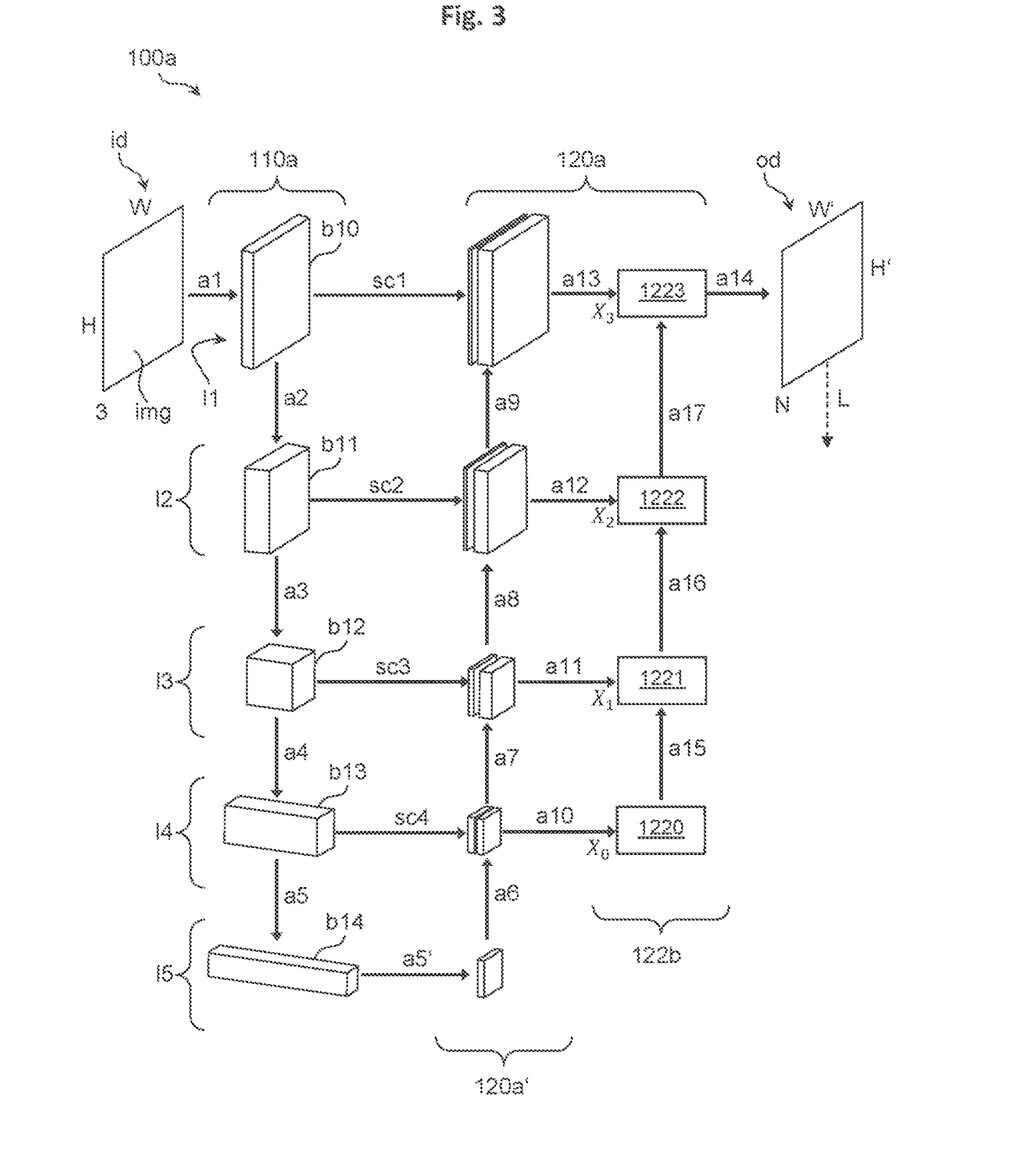

FIG. 3 schematically depicts a block diagram of aspects of an apparatus 100a according to a further embodiment. In the top left section of FIG. 3, an input image img is provided as input data id. The input image img comprises a width W, a height H, and currently three colour channels (e.g., RGB), corresponding to three "layers".

Arrow a1 indicates that said input image img or the corresponding image data id (cf. FIG. 1) is provided to a CNN-based encoder 110a, which may e.g. be based on the encoder network architecture of a ResNet. According to preferred embodiments, the CNN-based encoder 110a is configured to produce progressively coarser (i.e., comprising lower resolution, as compared to the resolution of the input image img) feature maps to encode contextual and/or appearance information of the input image, whereby different levels 11, 12, 13, 14, 15 of hierarchy are defined. For this purpose, the encoder 110a applies various steps of convolution and/or downsampling (e.g., max-pooling or average pooling), which are not shown in detail in FIG. 3 for the sake of clarity. However, generally, the spatial resolution of the obtained feature maps fm decreases with increasing hierarchy level 11, . . . , 15. Note that the number of feature maps, however, increases with increasing hierarchy level. This is schematically depicted by the shape of the blocks b10, b11, b12, b13, b14.

As an example, processing steps as indicated by arrow a1 may comprise a downsampling step of downsampling the input image img by a factor of two, i.e. reducing its spatial resolution regarding height H and width W by 50 percent. Further processing such as convolutions and the like may be applied according to further embodiments, whereby 64 feature maps are obtained, cf. block b10. Further downsampling and CNN-based encoding processing, cf. arrow a2, leads to 256 many feature maps at hierarchy level 12, cf. block b11. Similar observations apply to the further arrows a3, a4, a5, cf. the blocks b12, b13, b14.

FIG. 3 also depicts a decoder 120a according to preferred embodiments. The decoder 120a is configured to progressively map the (low resolution) encoder feature maps, cf. blocks b10 to b14 and arrows a5', a6, a7, a8, a9, to higher resolution feature maps, preferably to one or more (presently N many) full input resolution feature maps as output data od, which e.g. enables pixel-wise classification. In other words, output data od may again comprise matrix form with width W' (preferably equal to width W) and height H' (preferably equal to height H) and N many layers. For this, the decoder 120a comprises a "regular" decoder path 120a'.

According to preferred embodiments, in addition to a basic data connection a5' from the encoder 110a to the decoder 120a at hierarchy level 15, the apparatus 100a comprises optional skip connections sc1, sc2, sc3, sc4 from encoder layers to decoder layers to incorporate low-level but high-resolution feature maps in order to obtain accurate per-pixel predictions. In other words, a skip-connection enables to transfer information (data) from a feature map at a particular level of hierarchy from the encoder 110a directly to the decoder 120a, which may be considered as bypassing further encoder (and decoder) processing through further levels of hierarchy.

According to further embodiments, other numbers of skip connections sc1, sc2, sc3, sc4 than exemplarily depicted by FIG. 3 are also possible.

Advantageously, the decoder 120a comprises a Conv-LSTM module 122b which may e.g. be implemented in the form of the single Conv-LSTM unit 122a of FIG. 2. In other words, blocks 1220, 1221, 1222, 1223 represent the unrolled single Conv-LSTM unit 122a of FIG. 2. As sequential processing of at least some of the feature maps fm (FIG. 1) is proposed according to the embodiments, said single Conv-LSTM unit 122a (FIG. 2) is sufficient for subsequently processing respective input data in the sense of the unrolled blocks 1220, 1221, 1222, 1223.

As an example, in a first step, referring to block 1220, the single Conv-LSTM unit 122a of FIG. 2 receives first input data $x_0$, also cf. the arrow a10 and performs the operation as explained above with respect to FIG. 2. According to further embodiments, the so obtained output data $C_i$, $h_i$(FIG. 2) is processed by the processing unit 122a' (FIG. 2), which is configured to perform up-sampling and/or a deconvolution of said data $C_i$, $h_i$, which enables to accommodate a change of spatial resolution across the feature map pyramid along the decoder path (i.e., along a positive vertical direction of processing within the decoder 120a). The so processed output data of block 1220 is provided as input to the further block 1221, cf. arrow a15, in addition with respective feature-map based input data $x_1$ of the next level l3 of hierarchy, cf. arrow a11. In practice, this means that the same single Conv-LSTM unit 122a of the decoder 120a may evaluate the output data of block 1220, as sequential processing is provided for. Similar observations apply to the further LSTM-stages 1222, 1223 of the decoder 120a, cf. the arrows a16, a12 for block 1222 and a17, a13 for block 1223.

As can be seen from FIG. 3, the LSTM-stages 1220, . . . , 1223 enable to efficiently propagate and retain feature map information of lower levels l1, l2 to higher levels l3, l4 (as seen in a direction of decoding processing, i.e. vertically upwards in FIG. 3) of the decoder 120b, even up to the output data od, cf. arrow a14, while according to preferred embodiments, only one single Conv-LSTM unit 122a (FIG. 2) is required due to the sequential processing of data by the Conv-LSTM unit 122a.

To summarize, according to preferred embodiments, the decoder 120a concatenates and transforms feature maps fm from the encoder 110a progressively and takes the feature pyramid $(x_1, \ldots, x_i)$ as input and sequentially models and performs inference.

According to further embodiments, the Conv-LSTM module 122 (FIG. 1) of the decoder 120 may also comprise more than said one (single) Conv-LSTM unit 122a.

According to further embodiments, based on said output data od, a loss L may be determined, e.g. to facilitate a training process of the encoder 110 and/or decoder 120. Particularly, during said training, the (bias) parameters of the Conv-LSTM unit 122a (FIG. 2) may be learned.

According to further embodiments, processing as indicated by arrow a14 comprises a deconvolution and upsampling (by factor 2) processing, wherein a final hidden state input is denoted by reference sign $x_3$. This way, predications may be performed.

Alternatively, processing as indicated by arrow a14 may comprise a fully connected layer, so that the apparatus 100a may be used to perform sparse prediction.

According to further embodiments, processing the input data $x_0, x_1, x_2, x_3$ for the LSTM-stages 1220, 1221, 1222, 1223 may comprise performing a convolution, e.g. 1×1 convolution.

Figure 4:
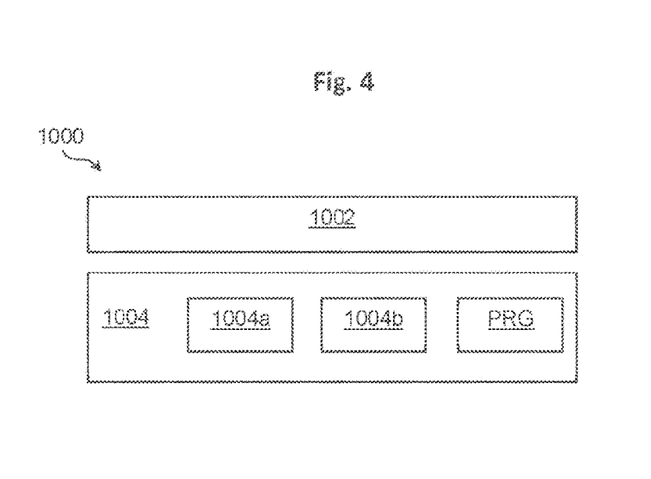

FIG. 4 schematically depicts a block diagram of an apparatus 1000 according to further embodiments. The apparatus 1000 comprises at least one calculating unit 1002 such as a processer, e.g. microprocessor, and/or microcontroller and/or digital signal processor and/or application specific integrated circuit (ASIC) and/or programmable logic circuit (e.g., an application specific integrated circuit, ASIC) and/or a tensor processor or the like or any combination thereof.

The apparatus 1000 further comprises a memory unit 1004 comprising volatile memory (such as e.g. a random access memory, RAM) 1004a and/or non-volatile memory 1004b (e.g., a Flash-EEPROM). One or more computer programs PRG for the calculating unit 1002 may also be stored within the memory unit 1004.

According to further preferred embodiments, the apparatus 1000 of FIG. 4 comprises and/or implements the functionality of any of the apparatus 100, 100a as explained above or any combination thereof. Advantageously, the calculating unit 1002 may evaluate processing steps that may be used for implementing the encoder 110 and/or the decoder (and its Conv-LSTM unit 122a) or any components thereof, e.g. performing processing steps of convolution and/or upsampling and/or downsampling and the like.

According to further preferred embodiments, one or more feature maps fm and/or the image data id and/or the output data as well as data related to hidden layers and the operation of the Conv-LSTM unit 122a or any data derived therefrom may at least temporarily be stored within the memory unit 1004.

Figure 5:
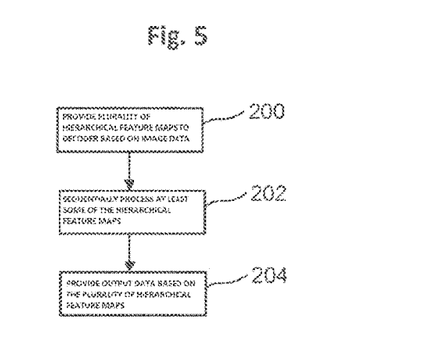

Further embodiments feature a method of operating an apparatus 100, 100a, 1000 for processing image data id associated with at least one input image img, said apparatus comprising a convolutional neural network, CNN,-based encoder configured to provide a plurality of hierarchical feature maps based on said image data and a decoder configured to provide output data based on said plurality of feature maps, wherein said decoder comprises a convolutional long short-term memory, Conv-LSTM, module, and wherein said Conv-LSTM module sequentially processes at least some of said plurality of hierarchical feature maps. FIG. 5 depicts a simplified flow-chart of a method according to the embodiments. In step 200, the encoder provides said feature maps fm. In step 202, the Conv-LSTM module 122 (FIG. 1) sequentially processes at least some of said plurality of hierarchical feature maps fm. In step 204, the decoder provides output data od. Note that the present sequence of steps is only exemplary and that according to further embodiments, said steps may also be carried out in another sequence or at least partly simultaneously.

Further embodiments feature a method according to the embodiments, wherein said method is used for at least one of the following: a) dense prediction, particularly semantic segmentation and/or optical flow estimation, b) sparse prediction, particularly image classification and/or image recognition and/or object detection and/or regression, particularly object and/or camera pose estimation. In other words, the generation of output data od by the decoder 120, 120a may involve steps of image analysis and/or classification as mentioned above, or such steps of image analysis and/or classification may be performed based on the output data od as provided by the decoder 120, 120a according to the embodiments.

Figure 6A:
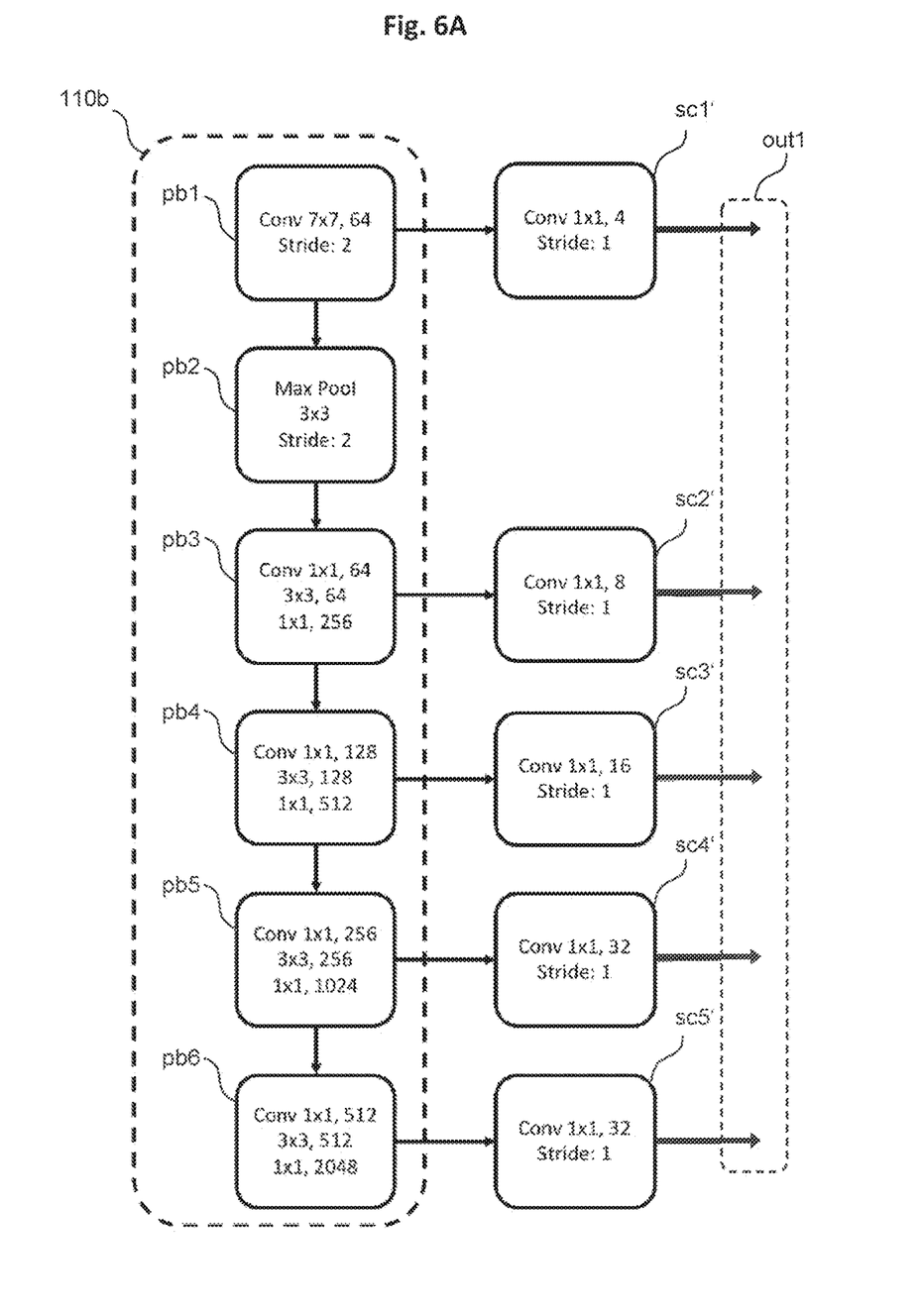
Figure 6B:
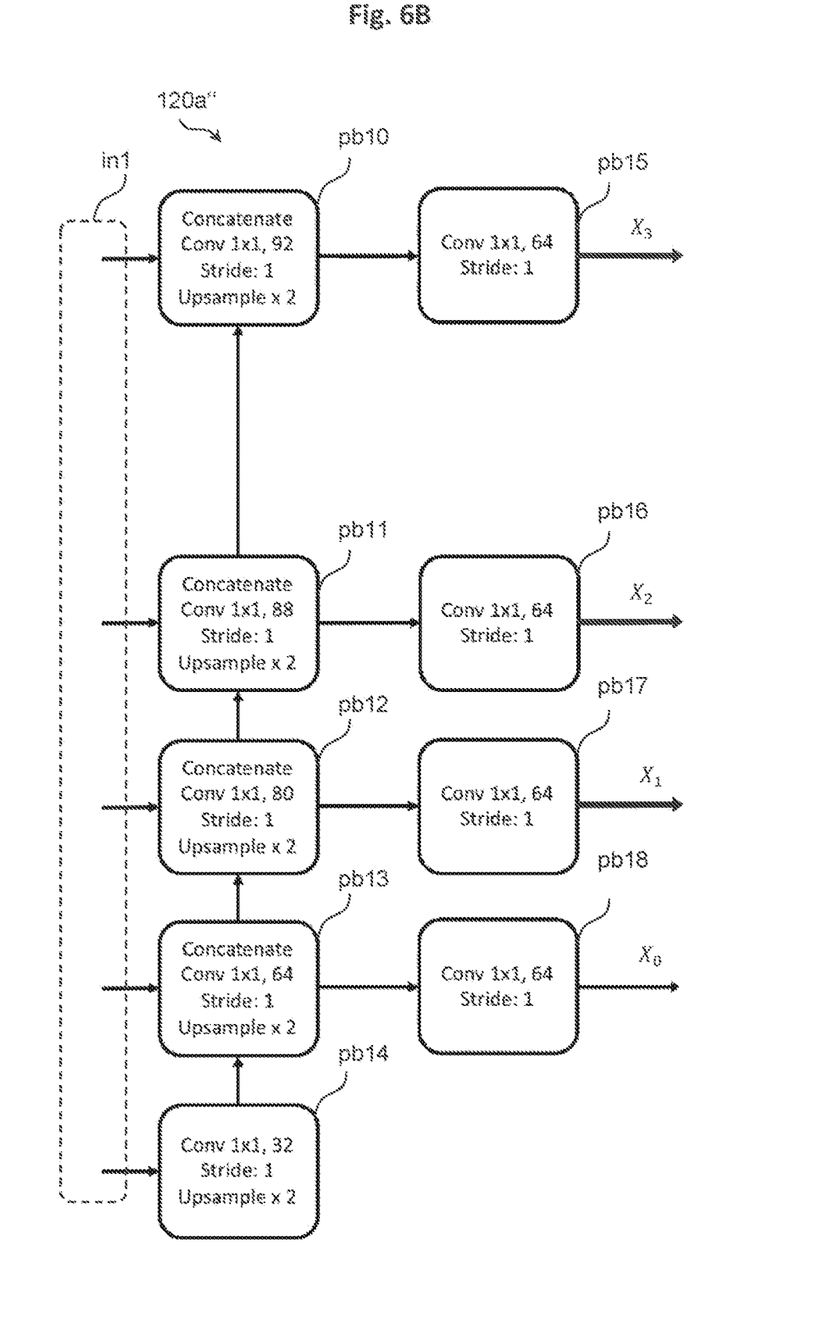
Figure 6C:
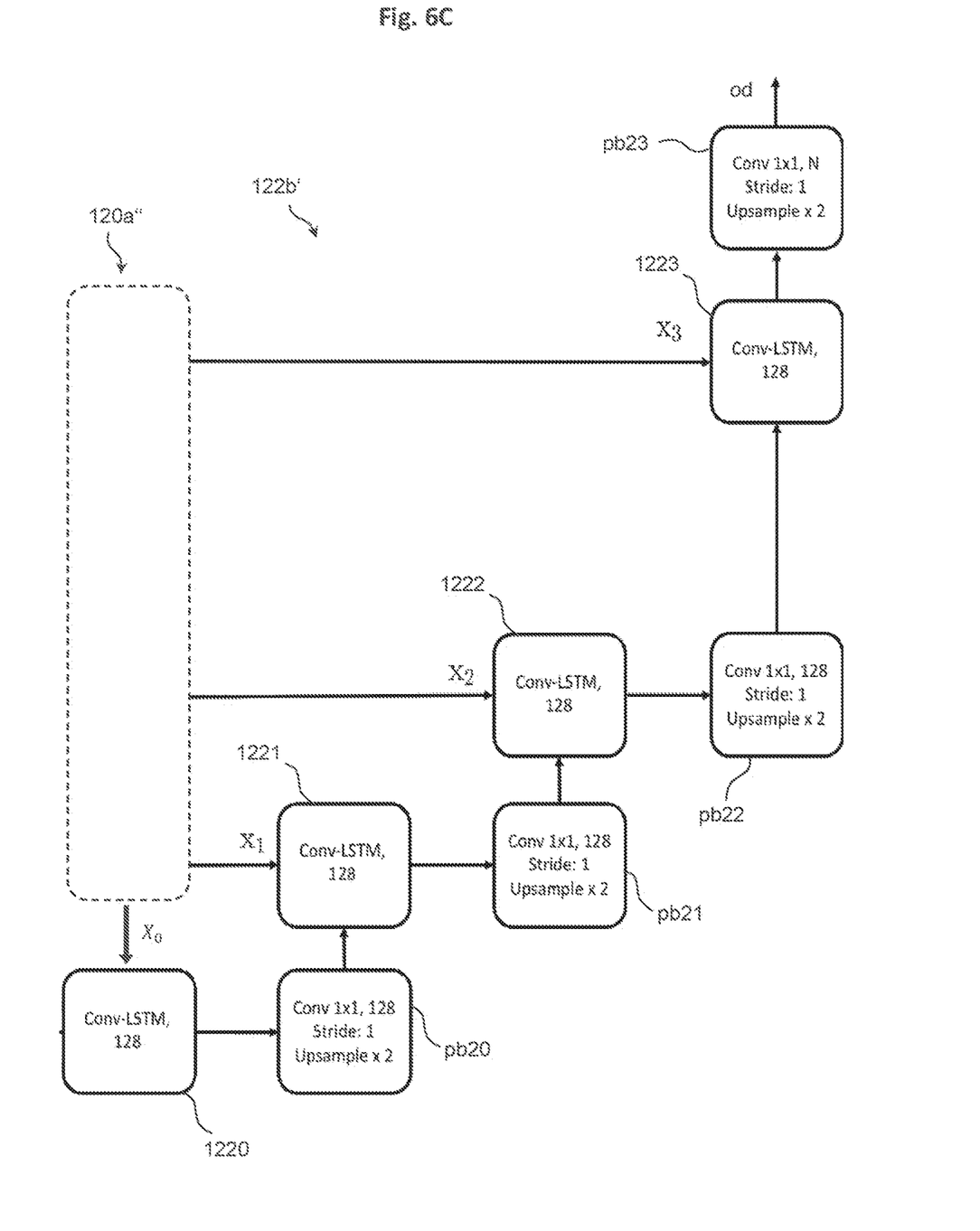

FIG. 6A, 6B, 6C each schematically depict details of aspects of an apparatus according to further embodiments. More specifically, FIG. 6A schematically depicts aspects of a CNN-based encoder 110b comprising processing blocks pb1, pb2, pb3, pb4, pb5, pb6, FIG. 6B schematically depicts aspects of a decoder 120a'' comprising processing blocks pb10, pb11, pb12, pb13, pb14, pb15, pb16, pb17, pb18, and FIG. 6C schematically depicts aspects of a Conv-LSTM module 122b' comprising instances 1220, 1221, 1222, 1223 of said unrolled single Conv-LSTM unit 122a of FIG. 2, as well as processing blocks pb20, pb21, pb22, pb23.

According to preferred embodiments, processing block pb1 (FIG. 6A) receives input data, e.g. the image data id (optionally already downsampled, as mentioned above with respect to arrow a1 of FIG. 3) and performs convolution operations on said input data, e.g. with filter size 7×7 and a stride of 2, thus obtaining 64 feature maps (cf. e.g. block b10 of FIG. 3) which may e.g. be provided to blocks sc1' and pb2. According to preferred embodiments, processing block pb2 performs a 3×3 max-pooling operation with stride of 2 on the data obtained from processing block pb1. The further processing blocks pb3, . . . , pb6 each perform further convolution operations as exemplarily indicated within the respective blocks of FIG. 6A, and the so obtain output data of said further processing blocks pb3, . . . , pb6 may e.g. provided to a subsequent processing block pb4, pb5, pb6 of the encoder 110b and/or a (skip) connection block sc2', . . . , sc5' of a same level of hierarchy l2, l3, l4, l5

(FIG. 3). According to further embodiments, the processing as provided by any of the blocks pb1 and/or bp3 and/or pb4 and/or pb5 and/or pb6 may be repeated for a predetermined number of times, wherein different numbers of repetitions are also possible for different ones of said blocks.

Blocks sc1', sc2', sc3', sc4' represent optional skip connections and the related processing, similar to arrows sc1, sc2, sc3, sc4 explained above with reference to FIG. 3. As an example, skip connection block sc1' provides for convolution operations on the data output by block pb1 with filter size 1×1 and stride 1, obtaining four feature maps that may directly be provided ("skipped") to the decoder 120a" of FIG. 6B. Similarly, skip connection block sc2' provides for convolution operations on the data output by block pb3 with filter size 1×1 and stride 1, obtaining eight feature maps that may directly be provided to the decoder 120a". The further skip connection blocks sc3', sc4', sc5' perform similar operations on their respective level of hierarchy, based on the respective data output by blocks pb4, pb5, pb6, providing respective numbers of feature maps for the respective (skip) connection (presently 16 feature maps for block sc3', 32 for block sc4', and also 32 for block sc5'). An output of the respective skip connection blocks sc1', . . . , sc4' and the "regular" connection sc5' is commonly denoted with reference sign out1 in FIG. 6A and provided to the decoder 120a", as indicated by reference sign in1 in FIG. 6B. In other words, processing block pb14 of the decoder 120a" receives the output of block sc5' of FIG. 6A, processing block pb13 of the decoder 120a" receives the output of block sc4' of FIG. 6A, processing block pb12 receives the output of block sc3', processing block pb11 receives the output of block sc2', and processing block pb10 receives the output of block sc1'.

According to further embodiments, processing block pb14 performs a convolution based on its input data as provided by blocks pb6, sc5' e.g. with a filter size of 1×1, stride 1, and upsampling by factor of two ("×2") obtaining 32 feature maps, which are provided to block pb13.

According to further embodiments, processing block pb13 receives "skip" feature maps via optional skip connection block sc4' (e.g., presently 32 feature maps, as mentioned above, cf. the arrow from the left in FIG. 6B pointing to block pb13) and said 32 feature maps as provided by block pb14, cf. the arrow from block pb13 to block pb14. Block pb13 concatenates the so received feature maps (resulting in e.g. 64 feature maps), performs a convolution based on the concatenated feature maps, e.g. with a filter size of 1×1, stride 1, and upsampling by factor of two ("×2") obtaining 64 feature maps, which are provided to block pb12.

Similarly, according to further embodiments, processing block pb12 receives "skip" feature maps via optional skip connection block sc3' (e.g., presently 16 feature maps, as mentioned above, cf. the arrow from the left in FIG. 6B pointing to block pb12) and said 64 feature maps as provided by block pb13, cf. the arrow from block pb13 to block pb12. Block pb12 concatenates the so received feature maps (resulting in e.g. 80 feature maps), performs a convolution based on the concatenated feature maps, e.g. with a filter size of 1×1, stride 1, and upsampling by factor of two ("×2") obtaining 80 feature maps, which are provided to block pb11.

Similarly, according to further embodiments, processing block pb11 receives "skip" feature maps via optional skip connection block sc2' (e.g., presently 8 feature maps, as mentioned above, cf. the arrow from the left in FIG. 6B pointing to block pb11) and said 80 feature maps as provided by block pb12, cf. the arrow from block pb12 to block pb11. Block pb11 concatenates the so received feature maps (resulting in e.g. 88 feature maps), performs a convolution based on the concatenated feature maps, e.g. with a filter size of 1×1, stride 1, and upsampling by factor of two ("×2") obtaining 88 feature maps, which are provided to block pb10.

Similarly, according to further embodiments, processing block pb10 receives "skip" feature maps via optional skip connection block sc1' (e.g., presently 4 feature maps, as mentioned above, cf. the arrow from the left in FIG. 6B pointing to block pb10) and said 88 feature maps as provided by block pb11, cf. the arrow from block pb11 to block pb10. Block pb10 concatenates the so received feature maps (resulting in e.g. 92 feature maps), performs a convolution based on the concatenated feature maps, e.g. with a filter size of 1×1, stride 1, and upsampling by factor of two ("×2") obtaining 92 feature maps, which are provided to block pb15.

According to further embodiments, block pb15 performs a further convolution with filter size 1×1, stride 1, thus obtaining input data $x_3$ for the instance 1223 (FIG. 6C) of the unrolled Conv-LSTM unit. Similarly, according to further embodiments, block pb16 performs a further convolution with filter size 1×1, stride 1 on output data as provided by block pb11 (e.g., said 88 feature maps), thus obtaining input data $x_2$ for the instance 1222 of the unrolled Conv-LSTM unit, block pb17 performs a further convolution with filter size 1×1, stride 1 on output data as provided by block pb12 (e.g., said 80 feature maps), thus obtaining input data $x_1$ for the instance 1221 of the unrolled Conv-LSTM unit, and block pb18 performs a further convolution with filter size 1×1, stride 1 on output data as provided by block pb13 (e.g., said 64 feature maps), thus obtaining input data $x_0$ for the instance 1220 of the unrolled Conv-LSTM unit.

According to further embodiments, instance 1220 of the unrolled (single) Conv-LSTM unit 122a (FIG. 2) receives input data $x_0$ as provided by block pb18, performs LSTM processing as explained above with respect to FIG. 2, and outputs its output data (also cf. arrow a15 of FIG. 3) to the next instance 1221, wherein preferably an intermediate further processing is provided by block pb20, similar to the function of the processing unit 122a' mentioned above with respect to FIG. 2. In other words, an output of block pb20 of FIG. 6C corresponds with arrow a15 of FIG. 3.

According to further preferred embodiments, the block pb20 performs convolution with filter size 1×1, stride 1, and ×2 upsampling. According to further embodiments, the further instances 1221, 1222, 1223 and the processing blocks pb21, pb22, pb23 operate in analogy to the elements 1220, pb20 as explained above with reference to FIG. 6C.

Thus, according to further embodiments, at an output of processing block pb23, output data od is obtained, also cf. arrow a14 of FIG. 3.

According to further embodiments, any of the encoders 110, 110a explained above may at least partly comprise the configuration 110b as depicted by FIG. 6A. According to further embodiments, any of the decoders 120, 120a explained above may at least partly comprise the configuration 120a", 122b' as depicted by FIG. 6B, 6C.

The principle according to the embodiments enables to provide a novel generic network architecture to enable accurate inference especially of dense predictions which may e.g. be used for running machine learning applications on devices such as mobile phones, camera connected smart home devices, video and teleconference devices, smart watches and other visual sensor-connected IoT devices.

Further, the principle according to the embodiments enables to significantly improve predication accuracy as compared with conventional decoders.

The description and drawings merely illustrate the principles of exemplary embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of exemplary embodiments and the concepts contributed by the inventor(s) to furthering the art, and are to be construed as being without limitation to such specifically recited examples and conditions. Moreover, all statements herein reciting principles, aspects, and embodiments, as well as specific examples thereof, are intended to encompass equivalents thereof.

It should be appreciated by those skilled in the art that any block diagrams herein represent conceptual views of illustrative circuitry embodying exemplary embodiments.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed and/or controlled by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus for processing image data associated with at least one input image, comprising:
at least one processor; and
at least one memory including computer program code;
the at least one memory and the computer program code configured to, with the at least one processor, cause the apparatus at least to implement a convolutional neural network (CNN),-based encoder configured to receive at least one input image and provide a plurality of hierarchical feature maps based on image data associated with the at least one input image to a decoder, the decoder configured to provide output data based on said plurality of feature maps to the apparatus, wherein said decoder comprises a convolutional long short-term memory (Conv-LSTM) module configured to sequentially process at least some of said plurality of hierarchical feature maps and model the at least some of the plurality of hierarchical feature maps as sequential data on a decoder path, and wherein the apparatus is configured to perform one of dense prediction or sparse prediction based on the output data and the sequential data.

2. The apparatus according to claim 1, wherein said Conv-LSTM module is configured to receive as input signals feature map information characterising at least one feature map of a certain hierarchical level of said decoder and/or hidden state information characterizing a hidden state or a transformed hidden state of a preceding hierarchical level of said decoder.

3. The apparatus according to claim 2, wherein said Conv-LSTM module is configured to update a cell status and/or a hidden state of said certain hierarchical level of said decoder depending on said input signals.

4. The apparatus according to claim 3, wherein the at least one memory and the computer program code are configured to, with the at least one processor, perform up-sampling and/or convolution and/or deconvolution of said cell status and/or a hidden state of said certain hierarchical level of said decoder.

5. The apparatus according to claim 1, wherein said Conv-LSTM module operates in accordance with at least one of the following equations: a) $f_i = \sigma(W_f \cdot [h_{i-1}^{\times 2}, x_i] + b_f)$, b) $s_i = \sigma(W_s \cdot [h_{i-1}^{\times 2}, x_i] + b_s)$, c) $\tilde{C}_i = \tanh(W_c \cdot [h_{i-1}^{\times 2}, x_i] + b_c)$, d) $C_i = f_i * C_{i-1} + s_i * \tilde{C}_i$, e) $o_i = \sigma(W_o \cdot [h_{i-1}^{\times 2}, x_i] + b_o)$, f) $h_i = o_i * \tanh(C_i)$, g) $h_i^{\times 2} = \mathrm{Conv}_{1 \times 1}(B_2(h_i))$, wherein $f_i$ represents a forget gate, $\sigma(\cdot)$ represents the sigmoid function, $W_f$ represents parameters associated with the forget gate, $x_i$ represents input feature map information, $h_{i-1}^{\times 2}$ represents a transformed hidden state of a preceding hierarchical level (13) of said decoder, $b_f$ represents bias parameters associated with the forget gate, $s_i$ represents an input gate, $W_s$ represents parameters associated with the input gate, $b_s$ represents bias parameters associated with the input gate, $\tilde{C}_i$ represents a candidate new cell state, $\tanh(\cdot)$ is the hyperbolic tangent function, $W_c$ represents parameters associated with the candidate new cell state, $b_c$ represents bias parameters associated with the candidate new cell state, $C_{i-1}$ represents an old cell state, $o_i$ represents an output gate, $W_o$ represents parameters associated with the output gate, $b_o$ represents bias parameters associated with the output gate, $h_i$ represents a hidden state, $B_2(h_i)$ represents a bilinearly upsampled hidden state, and $h_i^{\times 2}$ represents said bilinearly upsampled hidden state transformed by a 1×1 convolutional layer.

6. The apparatus according to claim 1, wherein the CNN-based decoder comprises at least portions of a CNN of at least one of the following types: ResNet, VGG-Net, AlexNet.

7. A method of operating an apparatus for processing image data associated with at least one input image, the method comprising: first providing, using a convolutional neural network (CNN) based encoder, a plurality of hierarchical feature maps based on image data associated with at least one received input image; second providing, using a decoder, output data based on said plurality of feature maps, the second providing including sequentially processing at least some of said plurality of hierarchical feature maps using a convolutional long short-term memory module (Conv-LSTM), the Conv-LSTM configured to model the at least some of the plurality of hierarchical feature maps as sequential data on a decoder path; and performing, based on the output data, one of dense prediction, or sparse prediction.

8. The method according to claim 7, wherein the first providing includes receiving, as input signals, feature map information characterising at least one feature map of a certain hierarchical level of said decoder and/or hidden state information characterizing a hidden state or a transformed hidden state of a preceding hierarchical level of said decoder.

9. The method according to claim 8, further comprising: updating a cell status and/or a hidden state of said certain hierarchical level of said decoder depending on said input signals.

10. The method according to claim 9, further comprising: up-sampling and/or deconvolution of said cell status and/or a hidden state of said certain hierarchical level of said decoder.

11. The method according to claim 7, wherein the second providing operates in accordance with at least one of the following equations: a) $f_i=\sigma(W_f \cdot [h_{i-1}^{\times 2}, x_i]+b_f)$, b) $s_i=\sigma(W_s \cdot [h_{i-1}^{\times 2}, x_i]+b_s)$, c) $\tilde{C}_i=\tanh(W_c \cdot [h_{i-1}^{\times 2}, x_i]+b_c)$, d) $C_i=f_i * C_{i-1}+s_i * \tilde{C}_i$, e) $o_i=\sigma(W_o \cdot [h_{i-1}^{\times 2}, x_i]+b_o)$, f) $h_i=o_i * \tanh(C_i)$, g) $h_i^{\times 2}=\text{Conv}_{1 \times 1}(B_2(h_i))$, wherein $f_i$ represents a forget gate, $\sigma(\cdot)$ represents the sigmoid function, $W_f$ represents parameters associated with the forget gate, $x_i$ represents input feature map information, $h_{i-1}^{\times 2}$ represents a transformed hidden state of a preceding hierarchical level (l3) of said decoder, $b_f$ represents bias parameters associated with the forget gate, $s_i$ represents an input gate, $W_s$ represents parameters associated with the input gate, $b_s$ represents bias parameters associated with the input gate, $\tilde{C}_i$ represents a candidate new cell state, $\tanh(\cdot)$ is the hyperbolic tangent function, $W_c$ represents parameters associated with the candidate new cell state, $b_c$ represents bias parameters associated with the candidate new cell state, $C_{i-1}$ represents an old cell state, $o_i$ represents an output gate, $W_o$ represents parameters associated with the output gate, $b_o$ represents bias parameters associated with the output gate, $h_i$ represents a hidden state, $B_2(h_i)$ represents a bilinearly upsampled hidden state, and $h_i^{\times 2}$ represents said bilinearly upsampled hidden state transformed by a 1×1 convolutional layer.

12. The method according to claim 7, wherein the CNN is of at least one of the following types: ResNet, VGG-Net, AlexNet, Inception.

\* \* \* \* \*